F. A. WINSLOW.

WINDOW.

APPLICATION FILED APR. 27, 1921.

Reissued July 5, 1921. 15,146.

3 SHEETS—SHEET 1.

Inventor
Francis A. Winslow

By his Attorneys
Kerr, Page, Cooper & Hayward

F. A. WINSLOW.

WINDOW.

APPLICATION FILED APR. 27, 1921.

Reissued July 5. 1921.

15,146.

3 SHEETS—SHEET 2.

Inventor
Francis A. Winslow

By his Attorneys
Kerr, Page, Cooper & Hayward

F. A. WINSLOW.

WINDOW.

APPLICATION FILED APR. 27, 1921.

Reissued July 5, 1921. 15,146.

3 SHEETS—SHEET 3.

Inventor
Francis A. Winslow

By his Attorneys
Kerr, Page, Cooper & Hayward

UNITED STATES PATENT OFFICE.

FRANCIS A. WINSLOW, OF NEW YORK, N. Y., ASSIGNOR, BY MESNE ASSIGNMENTS, TO AUSTRAL WINDOW COMPANY, OF NEW YORK, N. Y., A CORPORATION OF MAINE.

WINDOW.

15,146. Specification of Reissued Letters Patent. Reissued July 5, 1921.

Original application filed April 15, 1912, Serial No. 690,722; renewed May 12, 1916, Serial No. 97,182; original No. 1,351,083, dated August 31, 1920. Divided and application filed May 29, 1914, Serial No. 841,718; original No. 1,303,752, dated May 13, 1919. Application for reissue filed April 27, 1921. Serial No. 465,074.

*To all whom it may concern:*

Be it known that I, FRANCIS A. WINSLOW, a citizen of the United States, residing at New York, in the county of New York and State of New York, have invented a certain new and useful Improvement in Windows, of which the following is a full, clear, concise, and exact description, reference being had to the accompanying drawings, forming a part of this specification.

My invention relates to an improved construction of window by which the window is made in two parts so mounted in a window-frame that one part counterbalances the other, the parts being so connected that they may be swung upon supporting levers so as to secure any desired degree of opening between the window-sashes and the casing. The counterbalance of the sashes is secured without the use of weights of any description outside of the sashes themselves and, furthermore, the sashes are so disposed in the window-frame that when the window is closed the two sashes lie substantially in the same plane, thus presenting a continuous and practically unbroken surface to the weather, which adds much to the architectural effect of the structure. The construction of window described also permits the use of a much thinner window-frame than is the case with constructions in which the two sashes are in different planes and the reveals in the masonry may, therefore, be deeper with the same thickness wall, which also adds much to the architectural effect of the structure.

I am aware that constructions have been employed in the past in which the two sashes are connected by levers so as to counterbalance each other and I do not, therefore, claim broadly as my invention this arrangement. On the other hand, my invention consists in improved structural features by which the results described above are secured, as well as a construction facilitating the use of iron or steel in the window-frame and sashes for the construction of fireproof windows. In carrying out my invention, the sashes and frame are so constructed that there are inter-locking joints all around each sash, both with the window-frame and the other sash, as a result of which weather-tight joints are secured. My invention also contemplates an improved means for clamping the sashes together when the window is closed and means by which the sashes may be swung inside of the frame, so that the outside of the glass may be washed. By my invention I also provide an improved shade supporting arrangement, so that shades carried by the sashes are positively held in place and serve as awnings when the window is open.

The above as well as other features characterizing my invention will appear more clearly from the accompanying drawings, which are as follows.

Similar numerals refer to similar parts throughout the several views.

Figure 3:
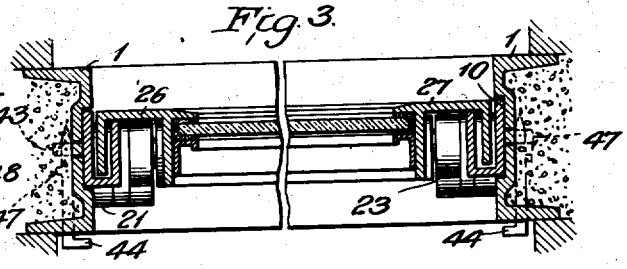
Fig. 3 is a horizontal sectional view taken transversely through the upper sash shown in Figs. 1 and 2.
Figure 4:
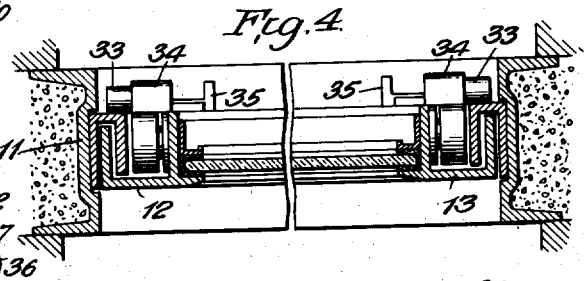
Fig. 4 is a view similar to Fig. 3 through the lower sash shown in Figs. 1 and 2.
Figure 5:
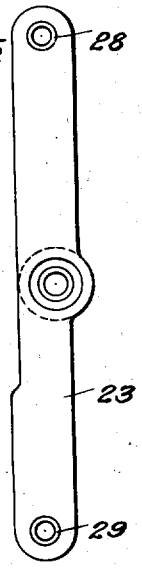
Figs. 5 and 6 are detail views of one of the supporting levers illustrating how the said lever is connected to the window-frame and sashes.
Figure 6:
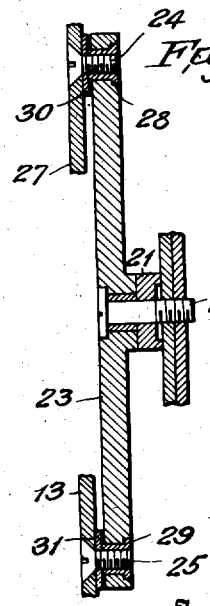

As shown in the drawings, the window-frame is made of a channel section 1 constructed so that its flanges extend outwardly to engage the masonry of the building. The channel section 1 has secured across its inner face at the top of the window-frame an angle bar 2 to serve as a stop for the upper sash 3 to close the joint between the sash and the frame to exclude rain and cold. The lower portion of the frame is of such conformation that an upwardly extending flange 4 is provided to enter between the members 5 and 6 of the lower rail of the lower sash 7. The upper surface of the bottom of the window-frame is inclined downward, as indicated, to shed the water which drops upon it from the lower sash and, if spray should be projected into the air chamber between the members 5 and 6 and the flange 4, it will drain into the inner surface 8 of the bottom of the window-frame which is curved upwardly, as indicated, and be caused thereby to flow through the drainage openings 9 into the outer part of the window-frame and thus away from the inside of the building. The members 5 and 6 are made a snug fit against the flange 4 so that it is with difficulty that any spray would be projected through the joint. The side members of the window-frame are of channel construction, as indicated in Figs. 3 and 4, and have formed longitudinally therein in their exposed faces shallow grooves for receiving channel bars of special conformation, as indicated at 10 and 11 in Figs. 3 and 4, the open sides of the channels being toward the outside of the room for the upper half of the window and directed toward the room for the lower half of the window.

The lower sash 7 is formed of vertical channel sections 12 and 13, so made that the outer flanges enter the channels in the channel bars 11 when the lower sash is closed and the outer flanges of the channel bars 11 enter the channels in the channel bars 12 and 13, the conformation of the parts being such that for the closed position of the sash each channel bar engages the bottom of the channel which it occupies. The upper rail of the lower sash is formed of a channel section 14 open toward the outside of the building to receive the outer flange of a channel section 15 constituting the lower rail of the upper sash 3. The channel section 15 is provided with a downwardly extending outer flange 16 which engages the outer surface of the channel section 14 immediately above the glass 17. The channel sections 14 and 15 are so conformed that a considerable air space 18 is left between them, thus permitting free expansion and contraction of the metal parts without changing the closeness of the fit of the weather joints. It will be noticed that the upper rail 14 of the lower sash and the lower rail 15 of the upper sash engage each other at three points, thus making it practically impossible for the weather to beat in from the outside of the window into the room. The members 5 and 6 constituting the lower rail of the lower sash also form between them a considerable air space 19, and the top rail of the upper sash is made of metal sections which inclose a considerable air space 20, which air spaces are of great advantage in connection with fireproof windows, since they act as a fire retardant and prevent the warping and twisting out of shape of the frame as soon as it would be accomplished were the air spaces not present. It is not essential that air spaces be provided between the channel bars 10 and the channel bars 26 and 27, or between the channel bars 11 and the channel bars 12 and 13, since the deep interlock between these sections provides that the window could not be twisted or warped clear of the frame by the application of heat. If for any reason air spaces are desired at the sides of the shell, they may easily be provided by increasing the sizes of the channel sections just referred to, which will, of course, reduce to a certain extent the size of the glass for a given size window-frame.

The side members 26 and 27 of the upper sash are formed in a manner similar to the side members 12 and 13 of the lower sash, the difference being that the open sides of the channel are faced inward instead of outward. When the two sashes 3 and 7 are of about the same height, as is usually the case, the joints between the upper channel sections 10 and the lower channel sections 11 occur at about the middle of the vertical sides of the window-frame 1 and, at that point, the outstanding portions of the channel bars cut away to receive a washer 21, which forms a support for the stud 22 used to form the pivot of the lever 23. One of these levers is mounted upon each side of the window and its ends are connected by bolts 24 and 25 with the upper and lower sash, respectively, the lever arms between the pivot 22 and the pins 24 and 25 being equal. The pivot bolt 22 and the washer 21 are preferably of bronze and the bolts 24 and 25 are threaded into bronze bushings 28 and 29, which form the bearing surfaces within the lever 23, so that the wearing surfaces are bronze against iron or steel throughout and thus the possibility of the joints "freezing" as a result of rusting of the iron is avoided. Washers 30 and 31 are provided between the lever 23 and the channel bars 27 and 13 for the same purpose. The channel bars 12 and 13 of the lower sash and the channel bars 26 and 27 of the upper sash are formed with sufficiently wide channels, so that when the window is closed the levers 23 are in vertical position and lie almost wholly within the channels formed in these bars, thus presenting a comparatively unbroken surface on the inside of the building up to nearly the middle of the upper sash.

Figure 1:
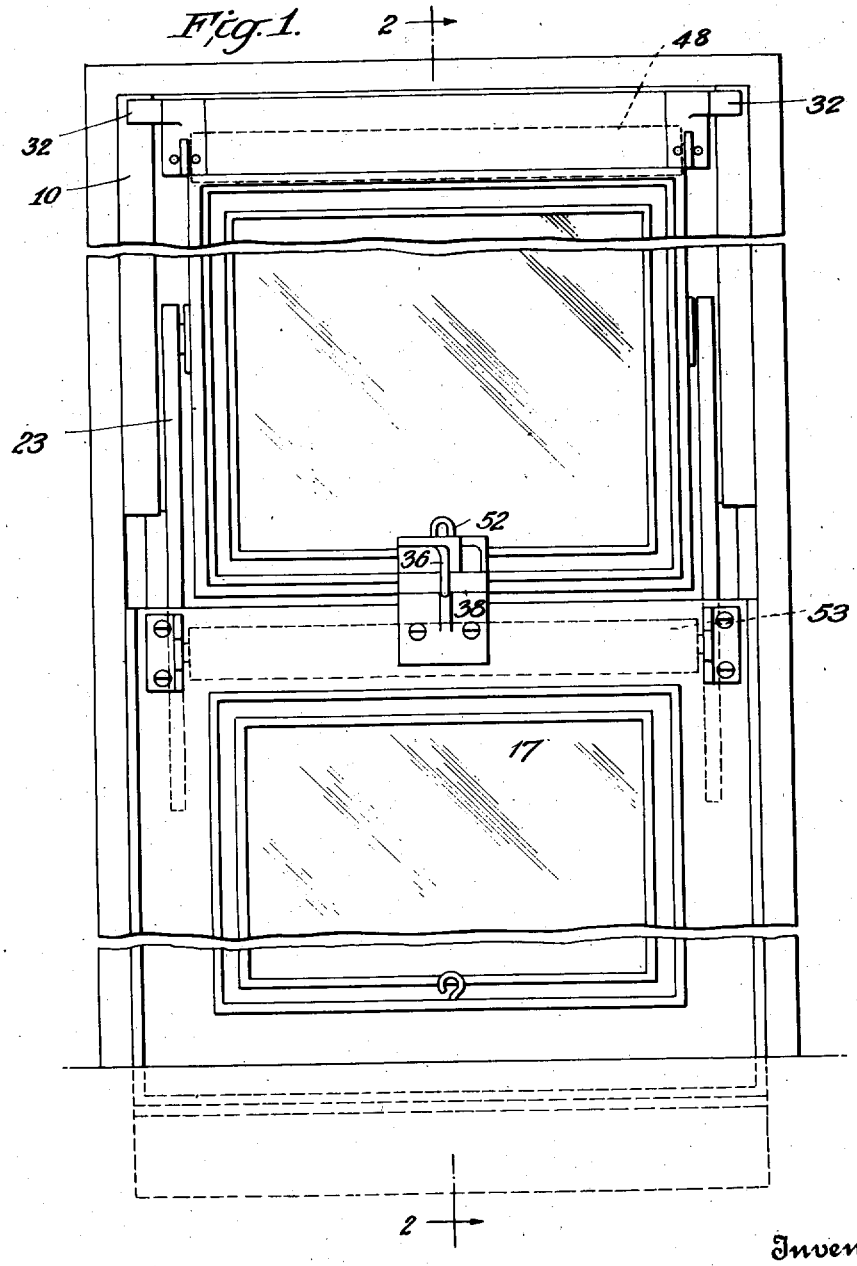
Figure 1 shows in inside elevation a window and frame constructed in accordance with my invention.
Figure 2:
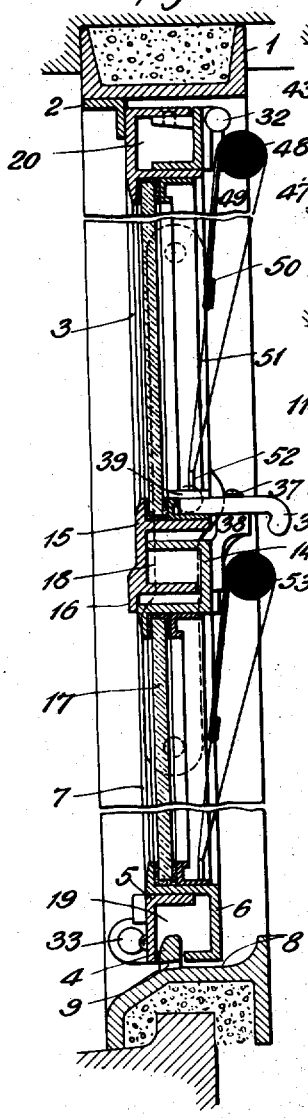
Fig. 2 is a vertical transverse sectional view taken through the parts shown in Fig. 1 along the line 2—2.

The upper sash 3 has secured to the ends of its upper rail, as indicated more clearly in Fig. 1, two rollers 32 which project around the backs of the channel bars 10, thus holding the upper ends of the channel bars 26 and 27 of the upper sash securely in engagement with said channel bars 10. The rollers 32 are preferably of bronze and their rolling action results in comparative ease of operation, when the sash is opened or shut and the further advantage also that the paint or enamel on the backs of the channel bars 10 will not be injured as would be the case if solid pins were used instead of said rollers.

Figure 9:
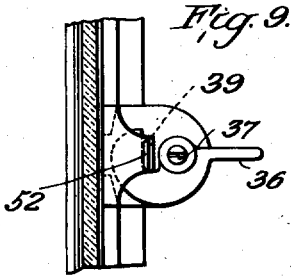
Fig. 9 shows a detail view of the sash clamping device.

The lower sash has mounted upon its bottom rail two bronze pins 33, as more clearly shown in Fig. 4, which normally project so as to lie just outside of the backs of the channel bars 11, as a result of which the lower ends of the channel bars 12 and 13 of the lower sash are held securely in engagement with said channel bars 11. The pins 33 are slidably mounted in housings 34 secured to the lower rail of the lower sash, springs being provided in the housings to hold the pins in place. The pins 33 are extended through the housings 34 into finger holds 35, by which the pins may be withdrawn from back of the channel bars 11 when it is desired to swing the lower sash into the room away from the channels 11 so that the outer surface of the glass 17 may be washed. When the sash are in closed position, the lower rail of the upper sash and the upper rail of the lower sash are clamped together by means of the cam 36, pivotally mounted at 37 upon a bracket 38 secured to the upper rail of the lower sash which cam 36, engages a catch 39 carried by the lower rail of the upper sash in such a manner that the cam surface moves the two rails laterally into tight clamping engagement when the cam is moved upon its pivot 37. This action is more clearly shown in Fig. 9.

Figure 10:
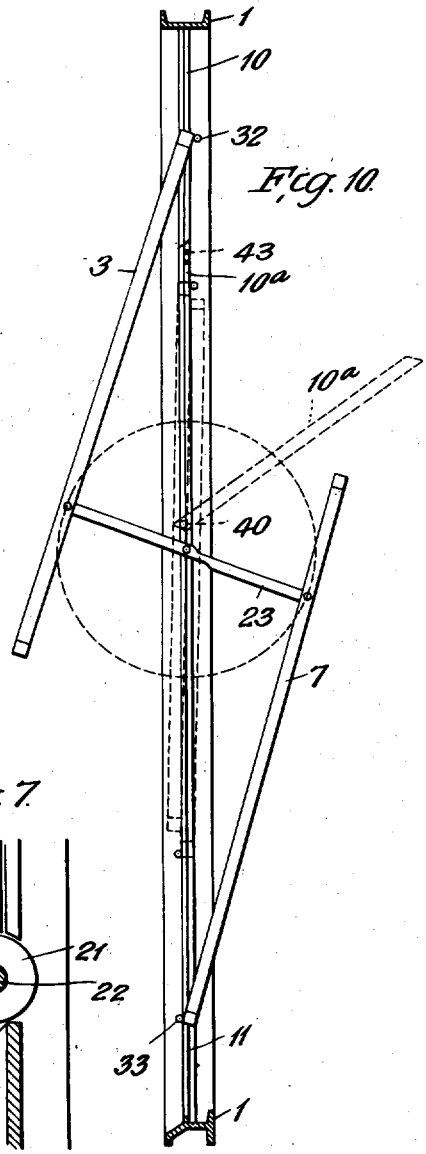
Fig. 10 is a diagrammatic view showing the nature of operation of the sashes when the window is opened.

The operation of the device described above will be more readily understood by reference to Fig. 10. When the window is shut the two sashes are in vertical position, as are also the balancing levers 23. When it is desired to open the window, the catch 36 is released and, by moving the bottom of the upper sash outward, the levers 23 being pivoted to the frame 1, force the top of the lower sash inward a sufficient amount so that the two sashes clear each other before the rotation of the levers 23 cause any vertical motion of the sashes. Continued motion of the levers 23 in the same direction causes the upper sash to be lowered and the lower sash to be raised, which operation may continue until the upper sash rests against the lower sash and is practically at the same height as the lower sash, as indicated in dotted lines in Fig. 10, which position is the one assumed by the sashes when the window is wide open. It is apparent that the sashes may be left in any intermediate position that is desired and, since any wind that may be blowing exerts equal and opposite thrusts upon the two sashes, these forces are exerted upon the supporting levers in opposite directions and, as a result, there is no motion of the sashes either toward their open or toward their closed positions. It will be further observed that when it is desired to open the window but a small amount that the middle rails of the sashes may be separated somewhat without perceptibly changing the position of the upper rail of the upper sash and the bottom rail of the lower sash, which condition is particularly desirable when ventilation is necessary, but it is undesirable to permit a large quantity of cold air to enter the room.

Figure 8:
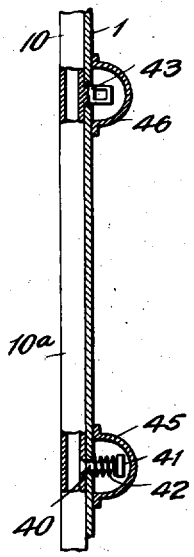
Fig. 8 shows a detail of the construction of the removable portion of the window-stop for purposes to be explained.
Figure 7:
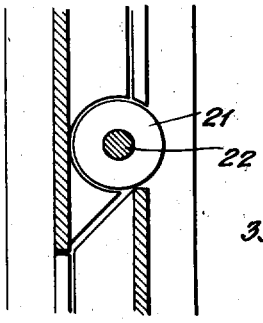
Fig. 7 is a detail view showing the nature of the joint made between the sashes around the supporting parts for the levers shown in Figs. 5 and 6.

In order to swing the upper sash 3 into the room, for cleaning the outer face of the glass mounted therein, provision is made to remove a portion of the channel bars 10 as follows: The portion of the bar, as shown at $10^a$ in Figs. 8 and 10, is provided with inclined upper and lower ends which fit the adjoining ends of the main channel bar 10, such portion $10^a$ being removably held in place as follows: The lower end of the section $10^a$ is provided with a bolt 40 which extends through the channel section 1 and has mounted upon it between said channel section 1 and its head 41 a spring 42, which normally exerts a thrust upon the section $10^a$ holding it into the longitudinal groove formed in the web of the channel section 1. The upper end of the section $10^a$ is provided with a lug 43 extending through the channel section 1, which lug has formed therein an opening adapted to be engaged by a taper pin 44, as shown in Fig. 3. The engagement between the lug 43 and the pin 44 holds the upper end of the section $10^a$ in the channel formed in the web of the window-frame section 1. The bolt 41 and the lug 43 are surrounded by housings 45 and 46 to protect them from the masonry built into the channel section 1 between its flanges. To lower the upper sash 3 into the room for cleaning purposes, the window is first opened a sufficient amount so that the section $10^a$ may be moved from its normal position. Then the taper pins 44 are drawn out, their removal from the channel section 1 being prevented by lugs or pins 47 projecting therefrom. Then the upper end of the section $10^a$ is forced out of engagement with the channel section 1 a sufficient amount to clear the lug 43 from the said section 1, and the section $10^a$ is turned against the action of the spring 42, so that it occupies the position indicated in dotted lines in Fig. 10. Then, the window is opened farther, so that the upper end of the upper sash comes below the fixed portion of the channel bar 10, and when in this position the upper end of the upper sash may readily be moved into the room until it rests upon the inturned section 10[a] of the channel bar 10.

The upper rail of the upper sash has mounted thereon, as indicated, a spring roller 48 for supporting a shade 49. The lower edge of the shade is secured to a cross-rod or bar 50, from which a cord 51 extends downward through an eyelet 52 secured to the lower rail of the upper sash, from which eyelet the cord passes upward around the outside of the shade on the roller 48 and down to the cross-bar 50, where it is secured to the upper end of the cord 51, thus making a continuous belt through the eyelet 52 and around the roller 48, which positively holds the shade 49 in any position to which it may be adjusted without permitting it to sag or flop, when the sash is moved to an inclined position, as indicated in Fig. 10. The lower sash is similarly provided with a roller 53 which supports a corresponding shade in a similar manner on the inner surface of the lower sash. The cross-bar 50 may have a screw-eye inserted into it at about its middle position, or the ends of the cord may be joined through an eyelet inserted through the central portion of the bar, as desired.

While I have shown and described above a window in which the sashes are of substantially the same size, my invention is not limited to this proportion, since the upper sash may, if desired, be of much less height than the lower sash, in order to secure the so-called "transom" effect. For this construction, the parts will be so proportioned that the supporting levers would operate the upper sash in the same manner as though both sash were of the size of the upper sash, thus bringing the upper sash to a position so that its top is substantially alined with the top of the lower sash when the window is wide open. For this arrangement, in order that the weights of the two sash may be equal, the upper sash may be provided with additional weight by filling in the hollow sections of the upper rail and the channels of the remaining portion of the frame of the sash as required.

While I have shown my invention in the particular embodiment herein described, it will, of course, be understood that many equivalents may be employed instead of the exact construction shown without departing from the spirit of my invention.

What I claim is:—

1. In combination, a window frame, an upright channel member on each side of the frame, a pair of swinging sashes mounted therein and having a channel member on each side thereof arranged to interlock with said upright channel members, said sashes swinging in opposite directions about their own respective pivots, the bottom of the upper sash being in the form of a channel member and the top of the lower sash being in the form of a channel member, said channel members being arranged so that their flanges interlock when the window is closed, the flanges of each channel contacting with the opposite channel to form a plurality of tight weather joints at such time.

2. In combination, a window frame, an upright channel member on each side of the frame, a pair of swinging sashes mounted therein and having a channel member on each side thereof arranged to interlock with said upright channel members, said sashes swinging in opposite directions about their own respective pivots, the bottom of the upper sash being in the form of a channel member and the top of the lower sash being in the form of a channel member, said channel members being arranged so that their flanges interlock when the window is closed, the flanges of each channel contacting at their outer edges with the opposite channel to form a plurality of tight weather joints, and being transversely spaced apart to form a substantially closed air space within said channel.

3. In a window of the kind described, a window frame, a sash having a channel member at the sides, said frame carrying a member arranged to enter said channel member to form a weather joint when the sash is in closed position, and a guide member carried by the sash and adapted to engage the outer surface of said channel entering member to prevent disengagement of said sash from said member at the point where said guide member is located.

4. In a window of the kind described, a window frame, a sash having a channel member at the sides, said frame carrying a member adapted to enter said channel member to form a weather joint when the sash is in closed position, a guide member carried by the sash adapted to engage the outer surface of said channel entering member to prevent disengagement of said sash from said member at the point where said guide member is located, and means for freeing the sash from said interlocking engagement.

5. A window comprising a frame and a pair of sashes located normally in the same vertical plane with each other and capable of being bodily raised and lowered in said frame, the upper sash having at its top and the lower sash having at its bottom means for engagement with the sides of the frame, in combination with a balance lever pivoted between its ends to the frame and at its ends to the upper and lower sashes respectively remote from their ends so that when the upper sash is in the uppermost position and the lower sash is in its lowermost position the bottom of the upper sash engages the top of the lower sash and guiding means for said sashes.

6. A window comprising a frame and a pair of sashes located normally in the same vertical plane with each other and capable of being bodily raised and lowered in said frame, the upper sash having at its top and the lower sash having at its bottom means for pivotal engagement with the sides of the frame and the bottom of the upper sash and the top of the lower sash provided with telescoping members, and a balance lever pivoted between its ends to the frame and at its ends to the upper and lower sashes respectively so that said sashes may be swung from normally closed position to open position and vice versa.

7. A window comprising a frame and a pair of sashes located normally in the same vertical plane with each other and capable of being bodily raised and lowered in said frame, the upper sash having at its top and the lower sash having at its bottom means for pivotal engagement with the sides of the frame, and a balance lever pivoted between its ends to the frame and at its ends to the upper and lower sash respectively, the pivot of the balance lever and the means for pivotal engagement between the sashes and the sides of the frame lying substantially in the same vertical plane.

8. A window comprising a frame and a pair of sashes located normally in the same vertical plane with each other and capable of being bodily raised and lowered in said frame with the bottom of the upper sash in the form of an inwardly open channel and the top of the lower sash in the form of an outwardly open channel telescoping with each other, means at the upper end of the upper sash and at the lower end of the lower sash for pivotally engaging the sides of the frame, and a balance lever pivoted between its ends to the frame and at its ends to the upper and lower sashes whereby said sashes may be swung from closed to open position and vice versa.

9. In combination, a window frame, a sash mounted to swing in said frame, a channel member at the side of the sash, and a lever pivoted to the frame and connected with said sash, said lever occupying a vertical position in the channel member when the sash is in the closed position.

10. In combination, a window frame, a pair of sashes mounted to swing and to move vertically in said frame, channel members at the sides of said sashes, members carried by the frame and adapted to interlock with said channel members, a pivot member mounted on each side of the frame and arranged to pass into the adjacent channel member, and a lever on each pivot member connected with both sashes and arranged to lie in vertical position in the corresponding channel member when the sashes are in closed position.

11. In combination, a window frame, a sash having a channel member at the side, said frame carrying a member arranged to enter said channel member to form a weather joint when the sash is in closed position, a retaining guide member carried by said sash and arranged to engage the member carried by the frame to maintain the interlocking engagement of said members but to permit a pivotal movement of the sash, and a lever connecting said sash with said frame.

12. A window comprising a pair of sashes located normally in the same vertical plane with each other, in combination with a frame therefor provided with parting members against which each of said sashes engage, balancing levers pivoted between their ends to said frame and at their ends to the upper and lower sashes, and guide means on said sashes for engaging the parting members to guide the sashes and permit them to swing on their pivots and assume angular positions with respect to the frame.

13. A window comprising a frame, in combination with a pair of sashes located normally in the same plane with each other, bars or members secured to the sides of said frame, balancing levers pivoted to the frame and having their ends pivotally connected to the upper and lower sashes, and guides attached to each of said sashes, said guides and sashes engaging the opposite faces of said members to guide the said sashes upon their upward and downward movement.

In testimony whereof I hereto affix my signature.

FRANCIS A. WINSLOW.